US008883241B2

(12) United States Patent
Bialek et al.

(10) Patent No.: US 8,883,241 B2
(45) Date of Patent: Nov. 11, 2014

(54) STABILIZED EDIBLE OIL-IN-WATER EMULSION COMPRISING GROUND, PULSE SEED

(75) Inventors: Jadwiga Malgorzata Bialek, Vlaardingen (NL); Jacob Nijsse, Vlaardingen (NL); Sabrina Silva Paes, Vlaardingen (NL); Robert Vreeker, Vlaardingen (NL)

(73) Assignee: Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 13/994,297

(22) PCT Filed: Dec. 6, 2011

(86) PCT No.: PCT/EP2011/071871
§ 371 (c)(1),
(2), (4) Date: Jun. 14, 2013

(87) PCT Pub. No.: WO2012/089448
PCT Pub. Date: Jul. 5, 2012

(65) Prior Publication Data
US 2013/0260008 A1 Oct. 3, 2013

(30) Foreign Application Priority Data
Dec. 27, 2010 (EP) .................................. 10197054

(51) Int. Cl.
A23L 1/24 (2006.01)
A23D 7/005 (2006.01)
A23L 1/20 (2006.01)

(52) U.S. Cl.
CPC *A23L 1/24* (2013.01); *A23L 1/2005* (2013.01)
USPC .......................................... 426/602; 426/629

(58) Field of Classification Search
None
See application file for complete search history.

(56) References Cited

U.S. PATENT DOCUMENTS 6,783,271 B1 8/2004 Makarenko et al.
2001/0026829 A1 10/2001 Ammedick-Naumann et al.

FOREIGN PATENT DOCUMENTS

| EP | 2183983 A2 | 5/2010 |
|---|---|---|
| WO | WO0152670 A1 | 7/2001 |
| WO | WO2006082640 A1 | 8/2006 |

OTHER PUBLICATIONS

Zang, T. et al. 2009. Food Hydrocolloids 23:146.*
Kasper L R, Chickpea mayonnaise with sweet-tart onions and basil, Chickpea Mayonnaise, 2008, www.starttribune.com/lifestyle/taste/recipes/26906864.
Scherz et al, Kickererbse/Chick pea, Food comp., 2000, 823-824, Medpharm GmbH Scientific Publishers.
EP Search Report in EP application EP 10 19 7054, dated Apr. 14, 2011.
PCT international Search Report in PCT application PCT/EP2011/071871, dated Mar. 16, 2012.
PCT international Written Opinion PCT/EP2011/071871.
International Preliminary Report on Patentability in PCT Application PCT/EP2011/071871, dated Nov. 27, 2012.

* cited by examiner

*Primary Examiner* — Carolyn Paden
(74) *Attorney, Agent, or Firm* — Ellen Plotkin

(57) ABSTRACT

The present invention relates to edible oil-in-water emulsions that have been stabilized by incorporation of a small quantity of ground, pulse seed and a related process of production thereof. More particularly, the invention provides an edible oil-in-water emulsion comprising: 15-80 wt. % of a continuous aqueous phase, said aqueous phase having a pH in the range of 3.0-5.0; 20-85 wt. % of a dispersed oil phase comprising more than 80 vol. % of oil droplets having a diameter of less than 20 μm; wherein the emulsion has an elastic modulus G' at 20° C. of 100-3500 Pa and contains 0.1-8% of finely ground pulse seed, calculated as dry matter by weight of aqueous phase, said finely ground pulse seed being obtained from pulse seed having the following composition, calculated on dry matter: 30-60 wt. % of starch; 1-40 wt. % of dietary fiber; 0.5-12 wt. % of sugars; 15-35 wt. % of protein; 0.8-12 wt. % of oil; wherein starch, dietary fiber, sugars, protein and oil together make up 95-100 wt. % of the dry matter contained in the pulse seed; and wherein the pulse seed contains starch and protein in a weight ratio of 2:3 to 3:1.

15 Claims, No Drawings

STABILIZED EDIBLE OIL-IN-WATER EMULSION COMPRISING GROUND, PULSE SEED

TECHNICAL FIELD OF THE INVENTION

The present invention relates to edible oil-in-water emulsions that have been stabilized by incorporation of a small quantity of ground, pulse seed. More particularly, the invention provides such edible emulsions having a pH in the range of 3.0 to 5.0. Examples of edible emulsions encompassed by the present invention include mayonnaise, dressings, soups, sauces, dips and drinks.

BACKGROUND OF THE INVENTION

The stability of oil-in-water emulsions is affected adversely by a number of different changes that may occur in the structure of these emulsions as time progresses.

There are basically five ways in which the structure of an emulsion of liquid droplets in a continuous medium can change:

1. Creaming/Sedimentation: No change in droplet size (or droplet size distribution), but build-up of an equilibrium droplet concentration gradient within the emulsion. This phenomenon results from external force fields, usually gravitational, acting on the system. "Creaming" is the special case in which the droplets collect in a concentrated layer at the top of an emulsion. "Sedimentation" occurs when the droplets collect in a concentrated layer at the bottom of the emulsion.
2. Flocculation: Again, no change in basic droplet size or distribution but the build-up of aggregates of droplets within the emulsion. The individual droplets retain their identity. This process of flocculation results from the existence of attractive forces between the droplets.
3. Coalescence: Flocculated droplets in the bulk of the emulsion, or alternatively, droplets within a close-packed array resulting from sedimentation or creaming, coalesce to form larger droplets. This results in a change of the initial droplet size distribution. The limiting state here is the complete separation of the emulsion into the two immiscible bulk liquids. Coalescence thus involves the elimination of the thin liquid film (of continuous phase) which separates two droplets in contact in an aggregate or a close-packed array. The forces to be considered here are therefore the forces acting within thin-liquid films in general.
4. Ostwald ripening: An alternative way in which the average droplet size in an emulsion can increase, without the droplets coalescing, occurs if the two liquids forming the disperse phase and the continuous phase, respectively, are not totally immiscible. This is the case in reality because all liquid pairs are mutually miscible to some finite extent. If one starts with a truly monodisperse emulsion system, then no effects arising from this mutual solubility will arise. However, if the emulsion is polydisperse, larger droplets will form at the expense of the smaller droplets owing to the process known as Ostwald Ripening. In principle, the system will tend to an equilibrium state in which all the droplets attain the same size (this may be, of course, that state when we have just one single large drop). The process of Ostwald ripening results from the difference in solubility between small and large droplets.
5. Phase inversion: A further way in which the structure of an emulsion may change is for the emulsion to "invert", e.g. for an o/w emulsion to change to a w/o emulsion.

This may be brought about by a change in temperature or concentration of one of the components or by the addition of a new component to the system.

The four main processes involved in emulsion destabilization are creaming (sedimentation), flocculation, coalescence and Ostwald Ripening. In practice, all four processes may occur simultaneously or sequentially in any order, depending on the relative rate constants for these processes under the conditions of storage of the emulsion.

If oil-in-water emulsions are stored for prolonged periods of time under varying temperature conditions, as is the case for retail products such as dressings and mayonnaise, the aforementioned destabilizing processes have to be slowed down. In order to achieve this, emulsifiers and/or water thickeners are commonly employed as structuring ingredients in these emulsions. Such emulsifiers usually have an HLB of greater than about 8.0. Examples of such emulsifiers include lecithins, PEG esters and proteins. Examples of water structurants include modified celluloses, starches (modified or non-modified), gums such as xanthan, agar, gelatin, carrageenan (iota, kappa, lambda), Gellan, galactomannans (guar, tara, cassia, LBG), konjac glucomannan, gum arabic, pectins, milk proteins, alginate, chitosan and cellulosic fibres.

However, the use of emulsifiers and water-structuring agents in edible oil-in-water emulsions has the disadvantage that consumers regard many of these ingredients as undesirable additives. Also, the use of these ingredients, e.g. in the form of egg yolk, can represent a substantial cost factor. Hence, it would be desirable if stable oil-in-water emulsions could be produced without or with fewer additives in the form of emulsifiers or water-structuring agents.

Chickpea mayonnaise is an oil-and-water emulsion that is made from chickpeas, oil, vinegar and other ingredients. A known recipe of chickpea mayonnaise is shown below:

1 medium onion, diced into 1-in. pieces
1 large garlic clove, crushed
¼ c. Spanish sherry vinegar, or cider vinegar, and more for later
½ tsp. freshly ground black pepper
½ tsp. ground cumin
½ tsp. sweet paprika (Spanish if possible)
Generous pinch hot red pepper flakes
1 (15-oz.) can chickpeas, rinsed and drained
¼ c. tightly packed fresh basil leaves, and more if needed
¼ to ⅓ c. good-tasting extra-virgin olive oil
Salt to taste A chicken pea mayonnaise can be prepared on the basis of this recipe by combining the onion, garlic, vinegar, black pepper, cumin, paprika and red pepper in a glass or pottery bowl; covering the bowl with a paper towel and microwaving at high power for 3 minutes; and letting the contents cool while preparing the other ingredients. In a food processor or blender, the chickpeas, basil and olive oil are combined starting with the smallest amounts. Next, the cooled vinegar-onion mixture is added and puréed. Salt, addition vinegar and seasonings may be added to taste and the total mixture is puréed until it is very smooth.

WO 01/52670 describes a food product comprising a starch and protein derived from a pea or lentil flour, wherein the flour starch has been at least partially gelatinized and the flour protein has been at least partially denatured and coagulated. Protein coagulation is achieved by inclusion of a protein coagulating agent, especially a calcium or magnesium salt.

US 2001/0026829 describes a semifluid, binding foodstuff composition for seasoning and/or coloring, comprising an oil-in-water emulsion of a food grade oil and water and (i)

ungelatinized starch and (ii) a vegetable powder and/or fruit powder in a finely divided form containing cell wall and/or fiber, wherein the starch and vegetable powder and/or fruit powder are not completely soluble in the water phase. Vegetable powders or fruit powders which are suitable are, in particular, a vegetable concentrate, pea flour, lentil flour, tomato puree, garlic powder, paprika powder, onion powder, mushroom powder, asparagus powder or apple concentrate. The content of the vegetable powder or fruit powder in the foodstuff is generally 10-50% by weight.

EP-A 2 183 983 describes a pourable dressing composition comprising natural fiber derived from minimally processing at least one whole fruit or whole vegetable, wherein the whole fruit or whole vegetable, before minimally processing, contains at least about 25 percent fiber;
wherein the whole fruit or whole vegetable, before minimally processing, is obtained in, or converted to, (1) a dehydrated form and (2) a powdered form having an average particle size of less than about 500 microns;
wherein the dehydrated and powdered form of the whole fruit or vegetable is minimally processed using an enzymatic treatment to reduce the initial viscosity without shear to less than about 12,500 cP;
wherein the enzymatically treated whole fruit or vegetable is incorporated into a pourable dressing base composition to form the pourable dressing composition containing at least 2.5 grains total fiber per single serving of the pourable dressing composition.

The fiber may be derived from whole vegetables that are high in fiber, such as beans, carrots, broccoli and the like. Example 4 of EP-A 2 183 983 describes a dressing comprising:
72.5 wt. % of an enzyme treated lupin bean slurry (31.67% w/w);
15 wt. % soybean oil;
2 wt. % salt;
5 wt. % sucrose;
4 wt. % vinegar;
0.4 wt. % phosphoric acid (85%);
1.1 wt. % water.

SUMMARY OF THE INVENTION

The inventors have unexpectedly discovered that acidified oil-in-water emulsions can be stabilized very effectively by incorporating therein a small amount of finely ground pulse seed, said finely ground pulse seed being obtained from pulse seed having the following composition, calculated on dry matter:
30-60 wt. % of starch;
1-40 wt. % of dietary fiber;
0.5-12 wt. % of sugars;
15-35 wt. % of protein;
0.8-12 wt. % of oil;
wherein starch, dietary fiber, sugars, protein and oil together make up 95-100 wt. % of the dry matter contained in the pulse seed; and wherein the pulse seed contains starch and protein in a weight ratio of 2:3 to 3:1. Examples of pulse seeds having such a composition include lentils, chickpeas, beans and peas.

Although the inventors do not wish to be bound by theory, it is believed that the starch, protein and fiber from the pulse seeds mentioned above provide water structuring properties and that the protein also provides emulsifying properties and that the balance between these water structuring and emulsifying properties is ideally suited for acidified oil-in-water emulsions that contain substantial levels of dispersed oil phase, e.g. 20-85 wt. %. In order to enable the starch, fibers and proteins to exert these effects within the oil-in-water emulsion, these biopolymers need to be released and hydrated. This is achieved by employing pulse seeds in finely ground form.

The present invention also provides a process of preparing an oil-in-water emulsion comprising:
preparing an aqueous dispersion containing 0.1-8 wt. % of finely ground pulse seed by mixing pulse flour and water and/or by shearing or milling a mixture of water and pulse seeds, wherein the finely ground pulse seed is obtained from a pulse seed as described herein before;
adding oil to the heated dispersion to produce an oil-and-water mixture; and
mixing the oil-and-water mixture to produce an oil-in-water emulsion comprising 80-100 vol. % of oil droplets having a diameter of less than 10 μm;
wherein 50-100 wt. % of the starch comprised in the aqueous dispersion is gelatinized prior to the addition of the oil.

The present process offers the advantage that it is very easy to operate and that it yields a very stable emulsion.

DETAILED DESCRIPTION OF THE INVENTION

Accordingly, one aspect of the invention relates to an edible oil-in-water emulsion comprising:
15-80 wt. % of a continuous aqueous phase, said aqueous phase having a pH in the range of 3.0-5.0;
20-85 wt. % of a dispersed oil phase comprising 80-100 vol. % of oil droplets having a diameter of less than 20 μm, preferably of less than 10 μm;
wherein the emulsion has an elastic modulus G' at 20° C. of 100-3500 Pa and contains 0.1-8% of finely ground pulse seed, calculated as dry matter, by weight of aqueous phase, said finely ground pulse seed being obtained from pulse seed having the following composition, calculated on dry matter:
30-60 wt. % of starch;
1-40 wt. % of dietary fiber;
0.5-12 wt. % of sugars;
15-35 wt. % of protein;
0.8-12 wt. % of oil;
wherein starch, dietary fiber, sugars, protein and oil together make up 95-100 wt. % of the dry matter contained in the pulse seed; and wherein the pulse seed contains starch and protein in a weight ratio of 2:3 to 3:1.

The term "dietary fiber" as used herein refers to indigestible non-starch polysaccharides such as arabinoxylans, cellulose, lignin, pectins and beta-glucans.

The term "sugars" as used herein refers to mono- and disaccharides.

The term "protein" as used herein refers to a linear polypeptide comprising at least 10 amino acid residues. Preferably, said protein contains more than 20 amino acid residues. Typically, the protein contains not more than 35,000 amino acid residues.

The term "oil" as used herein refers to lipids selected from the group of triglycerides, diglycerides, monoglycerides, phospholipids and free fatty acids. The term "oil" encompasses lipids that are liquid at ambient temperature as well as lipids that are partially or wholly solid at ambient temperature.

The contents of 'dietary fiber', 'sugar', 'protein', 'starch', 'fat' mentioned in this invention are determined according to the standards used by the U.S. Department of Agriculture, Agricultural Research Service. 2010. USDA National Nutrient Database for Standard Reference, Release 23.

The term "diameter" as used herein in relation to the droplet size of the dispersed oil phase, unless otherwise specified, refers to the diameter as determined with the help of confocal laser scanning microscopy.

The "finely ground pulse seed" of the present invention is suitably produced by milling or grinding dehulled or non-dehulled pulse seeds. The pulse seeds may be milled or ground as such, or they may be milled or ground in the presence of water, e.g. to produce an aqueous slurry or paste.

The requirement that the present emulsion contains 0.1-8% of finely ground pulse seed, calculated as dry matter, by weight of aqueous phase should be construed as: 0.1%<(parts by weight of dry matter of finely ground pulse seed)/(parts by weight of aqueous phase)<8%; wherein the aqueous phase, besides water, includes the part of the finely ground pulse seed that is contained therein, as well as other components (e.g. acidulant) that are contained therein.

The elastic modulus G' is the mathematical description of an object or substance's tendency to be deformed elastically (i.e., non-permanently) when a force is applied to it. The elastic modulus of an object is defined as the slope of its stress-strain curve in the elastic deformation region: $\lambda$=stress/strain
wherein lambda ($\lambda$) is the elastic modulus; stress is the restoring force caused due to the deformation divided by the area to which the force is applied; and strain is the ratio of the change caused by the stress to the original state of the object. The elastic modulus of an oil-in-water emulsion is suitably determined by oscillatory measurements, performed at 20° C. using a cone-plate geometry (cone: 4 cm, 2° and a truncation of 55 or 71 micrometer) at a frequency of 1 Hz in the oscillatory stress interval from 0.01 Pa to 1768 Pa (a stress sweep). Herein, the G' (Pa) is taken at plateau value (linear region).

Unless indicated otherwise, the term "viscosity" refers to the viscosity of the present emulsion at $10\ s^{-1}$ and 20° C. This viscosity is suitably determined with a Haake Rheometer (Rotovisco RV20) using a set of concentric cylinders (or bob-in-cup) with a 1 mm gap, the bob having a diameter of 1.0 cm and length of 1.0 cm. The inner cylinder or bob starts rotating from 0 shear and ramps up to a shear rate of $134\ sec^{-1}$ in 542 sec. By way of comparison, the viscosity values refer to the shear rate of $10\ sec^{-1}$.

Even when used in relatively low concentrations, the finely ground pulse seed of the present invention is capable of substantially improving the stability of the oil-in-water emulsion. Accordingly, the finely ground pulse seed preferably represents not more than 7%, more preferably not more than 6%, most preferably not more than 5.5% of the oil-in-water emulsion, calculated as dry matter by weight of aqueous phase. Typically, the finely ground pulse seed is employed in a concentration of at least 0.1%, even more preferably of at least 0.5% and most preferably of at least 1.5%, where the percentages are again calculated as dry matter by weight of the aqueous phase.

The inventors have found that the pulse seed protein plays an important role in structure formation and that it can seriously influence the rheology of the emulsion. This is in line with microscopy observations which show that these proteins form "bridges" between adjacent oil droplets, leading to formation of an aggregated oil-droplet network and increased product thickness. Furthermore, this finding was confirmed by experiments in which emulsions according to the present invention were treated with protease. As shown in the Examples, treatment of the present emulsion with protease resulted in a significant decrease of product thickness that could be quantified by measuring the drop in G' and viscosity that resulted from this treatment.

Typically, protease treatment of an oil-in-water emulsion according to the present invention results in a reduction of G' of more than 40%, more preferably of more than 60% and most preferably of more than 70%. The same protease treatment of the present emulsion typically results in a viscosity decrease of more than 30%, more preferably of more than 50% and most preferably of more than 60%.

The protease treatment as referred to herein is suitably carried out according to the following protocol:
a) if pH of the emulsion is less than 5.1, adjust pH of the emulsion to pH 5.1 using 1 N NaOH;
b) add a botanical protease solution (Promod 144GL, Biocatalysts Ltd, UK) to the emulsion at a level of 0.5 wt % and thoroughly mix it into the emulsion by hand;
c) incubate the emulsion at 40° C. for 24 hrs.
d) treat control samples (without protease) in the same way; but using 0.5 wt % millipore water instead of protease solution;
e) following incubation, store the samples at 5° C. for 3 wks before rheological characterisation.

The composition of the pulse seeds employed in the present emulsion is critically important to achieving the desired emulsion stability. Especially the balance between the amount of protein and starch comprised in the finely ground pulse seed is deemed to be of great importance. The composition of the finely ground pulse seed as comprised in the present emulsion is essentially identical to the composition of the pulse seed as defined herein.

The finely ground pulse that is employed in accordance with the present invention may be obtained from dehulled and/or non-dehulled pulse seed. The water-structuring and emulsifying properties of the finely ground pulse seed are believed to be largely attributable to the starch and protein components. Since the hulls of pulse seed predominantly consist of dietary fibre, dehulling does not significantly affect the functionality of the finely ground seed in the present emulsion. Preferably, the finely ground pulse seed employed is obtained from dehulled pulse seed.

According to a particularly preferred embodiment, the pulse seed comprised in the oil-in-water emulsion contains starch and protein in a weight ratio of 1:1 to 5:2, most preferably in a weight ratio of 1:1 to 2:1.

According to another preferred embodiment, the pulse seed comprised in the oil-in-water emulsion contains starch and dietary fiber in a weight ratio of 3:10 to 12:1, most preferably in a weight ratio of 1:2 to 8:1.

Typically, the pulse seed contains less than 25%, most preferably less than 20% of dietary fiber by weight of dry matter.

Globulins and albumins typically represent a major part of the protein contained in the pulse seed. Accordingly, in a preferred embodiment, globulins and albumins represent at least 50 wt. %, more preferably 55-95 wt. % and most preferably 60-90 wt. % of the protein contained in the pulse seed.

Emulsions of particular good quality can be obtained if the pulse seed contain globulins and albumins in a weight ratio that lies within the range of 10:1 to 1:1, or even more preferably in a weight ratio of 7:1 to 2:1.

In accordance with another preferred embodiment the globulins legumin and vicilin together represent at least 35 wt. %, more preferably 40-75 wt. % and most preferably 45-70 wt. % of the protein comprised in the pulse seed.

The protein glutelin preferably represents 5-30% by weight, more preferably 8-25% by weight of the protein comprised in the pulse seed.

The content of globulin, albumin, legumin, vicilin, and glutelin in the pulse seeds of the present invention is suitably determined by the method described by Gupta & Dhillon [Gupta, R., & Dhillon, S. 1993. Characterization of seed storage proteins of Lentil (*Lens culinaris* M.). *Annals of Biology*, 9, 71-78].

The protein provided by the finely ground pulse seed preferably comprises not more than a minor amount of sizeable coagulated protein aggregates. Typically, the finely ground pulse seed comprises 0-1 wt. % of coagulated protein aggregates having a hydrated diameter of at least 1.0 µm. The hydrated diameter can suitably be determined by Confocal Scanning Laser Microscopy with Nile Blue as fluorescent dye.

The protein provided by the pulse seed preferably is largely denatured, e.g. as a result of heat treatment. Preferably, 60-100 wt. %, more preferably at least 90-100 wt. % of the protein comprised in the finely ground pulse seed is denatured.

The starch provided by the finely ground pulse seed preferably is largely gelatinized. Preferably 50-100 wt. %, more preferably 70-100 wt. % and most preferably 90-100 wt. % of the starch contained in the emulsion is gelatinized. Gelatinized starch is believed to enhance the emulsion stability by structuring the continuous aqueous phase of the emulsion. The extent to which the starch present in the emulsion is gelatinized can suitably be determined by cross polarised light microscopy.

As described in WO 01/52670, divalent metal ions, such as $Ca^{2+}$ and $Mg^{2+}$ may induce protein gelation. In order to prevent this kind of protein gelation, it is preferred that the aqueous phase of the present emulsion comprises less than 1.0 mmol per gram of protein, more preferably less than 0.5 mmol per gram of protein of divalent metal cation selected from $Ca^{2+}$, $Mg^{2+}$ and combinations thereof. According to another preferred embodiment the present emulsion is not in the form of a gel (as opposed to the products described in WO 01/52670).

It is further preferred to not subject the finely ground pulse seed contained in the present emulsion to enzymatic treatment as described in EP-A 2 183 983. Accordingly, it is preferred that the protein and starch contained in said ground pulse seed is not enzymatically modified.

As explained herein before, it is important that the pulse seed is finely ground in order to release starch, protein and dietary fiber from the seed material. Advantageously, the finely ground pulse seed contains less than 10 wt. %, more preferably less than 5 wt. % and most preferably less than 1 wt. % of particles having a hydrated diameter of 200 µm or more. The hydrated diameter of the finely ground pulse seed is suitably determined by means of Confocal Scanning Laser Microscopy, using the fluorescent dye Acridine Orange.

The present emulsion preferably contains at least 0.1 wt. %, more preferably at least 0.15 wt. % and most preferably 0.2-10 wt. % of an acidulant selected from acetic acid, citric acid, lactic acid, malic acid, phosphoric acid, hydrochloric acid, glucono-delta-lactone and combinations thereof. Even more preferably, the emulsion contains 0.2-10 wt. % of an acidulant selected from acetic acid, citric acid and combinations thereof. Most preferably, the emulsion contains 0.2-10 wt. % of acetic acid.

The dispersed oil phase typically contains 50-100 wt. %, more preferably 70-100 wt. % and most preferably 90-100 wt. % of triglycerides. The oil phase advantageously contains a high level of unsaturated fatty acids. Typically, 40-100 wt. %, more preferably 50-100 wt. % and most preferably 60-100 wt. % of the fatty acids contained in the dispersed oil phase are unsaturated fatty acids. The melting point of the dispersed oil phase typically does not exceed 30° C., more preferably it does not exceed 20° C. and most preferably it does not exceed 10° C.

Examples of oils that may be employed in the oil phase of the present emulsion include those which are liquid at ambient temperature like avocado, mustard, cottonseed, fish, flaxseed, grape, olive, palm, peanut, rapeseed, safflower, sesame, soybean, sunflower, mixtures thereof and the like. Examples of oils that solid at ambient temperature and suitable for use in accordance with this invention include butter fat, cocoa butter chicken fat, coconut oil, palm kernel oil mixtures thereof and the like. The present invention also encompasses the use of olein and/or stearin fractions of the aforementioned oils.

The dispersed oil phase comprised in the present emulsion preferably represents at least 30 wt. %, most preferably at least 35 wt. % of the emulsion.

The edible emulsion may suitably contain one or more additional ingredients besides water, oil and ground pulse seed. Examples of such optional ingredients include acidulant, salt, spices, vitamins, flavouring, colouring, preservatives, antioxidants, chelators herbs and pieces of meat, vegetable or cheese. Such optional additives, when used, collectively, do not make up more than 40%, more preferably not more than 20% by weight of the emulsion.

The finely ground pulse seed comprised in the present emulsion is advantageously obtained from a pulse selected from lentils, chickpeas, beans and combinations thereof. Even more preferably, the finely ground pulse seed is obtained from a pulse selected from lentils, chickpeas, mung beans and combinations thereof. Most preferably, the finely ground pulse seed is finely ground lentils.

The stabilizing effect of the finely ground pulse seed on the present emulsion makes it possible to produce oil-in-water emulsions, such as mayonnaise, using reduced levels of emulsifier, notably egg yolk or egg yolk fractions. Thus, in accordance with a preferred embodiment, the emulsion comprises less than 4.0 wt. %, more preferably less than 2.0 wt. % egg solids. Most preferably, the emulsion contains no egg solids. Here the term "egg solids" refers to dry solids contained in egg derived components.

The edible emulsion of the present invention can be stabilized very effectively without using modified starch. Hence, in a preferred embodiment, the emulsion contains no modified starch. The term "modified starch" as used herein refers to an enzymatically or chemically treated starch.

The finely ground pulse seed of the present invention enables the production of stable oil-in-water emulsions without the need of using conventional water structuring agents.

Consequently, in accordance with an especially advantageous embodiment of the invention, the emulsion contains no added water structuring agent selected from modified cellulose, modified starch, xanthan, agar, gelatin, carrageenan (iota, kappa, lambda), Gellan, galactomannans (guar, tara, cassia, LBG), konjac glucomannan, gum arabic, pectins, alginate and chitosan.

Likewise, since the finely ground pulse seed can also replace emulsifiers that are conventionally used to stabilize oil-in-water emulsion, a particularly preferred embodiment of the invention relates to an oil-in-water emulsion that contains no added emulsifier selected from lecithin (e.g. egg yolk), monoglyceride, diglyceride and PEG ester.

The finely ground pulse seed has a very significant effect on the rheological properties of the present emulsion, e.g. in that it provides an elastic modulus G', measured at 20° C., within the range of 100-3500 Pa, most preferably in the range of 800-2000 Pa.

The viscosity of the present emulsion typically lies in the range of 100-80,000 mPa·s, more preferably in the range of 200-30,000 mPa·s at 10 s$^{-1}$ and 20° C.

Examples of edible oil-in-water emulsions according to the present invention include dressings, mayonnaise, soups, sauces and drinks. Preferably, the present emulsion is a dressing or a mayonnaise. Most preferably, the emulsion is a mayonnaise.

The emulsions according to the present invention typically are pourable or spoonable as opposed to solid. In case the present emulsion is non-pourable, it is preferred that the consistency of the emulsion is such that it cannot be cut in two as the parts of the emulsion that have been divided by the cutting will confluence after the cutting.

The present emulsion typically has a Stevens value at 20° C. of less than 300, most preferably of less than 200. The Stevens value, expressed in grams, can be determined by using a typical mayonnaise grid in a Stevens LFRA Texture Analyzer (ex. Stevens Advanced Weighing Systems, UK) with a maximum load/measuring range of 1000 grams and by applying a penetration test of 20 mm at 1 mm/s penetration rate in a cup having a diameter of 100 mm. The mayonnaise grid comprises square openings of appr. 3×3 mm, is made up of wire with a thickness of appr. 1 mm and has a diameter of 40 mm.

Another aspect of the invention relates to a process of preparing an oil-in-water emulsion comprising 15-80 wt. % of a continuous aqueous phase and 20-85 wt. % of a dispersed oil phase, said process comprising:

preparing an aqueous dispersion containing 0.1-8 wt. % of finely ground pulse seed by mixing pulse flour and water and/or by shearing or milling a mixture of water and pulse seeds, wherein the finely ground pulse seed is obtained from a pulse seed as defined herein before;

adding oil to the aqueous dispersion to produce an oil-and-water mixture; and mixing the oil-and-water mixture to produce an oil-in-water emulsion comprising 80-100 vol. % of oil droplets having a diameter of less than 10 μm;

wherein 50-100 wt. % of the starch comprised in the aqueous dispersion is gelatinized prior to the addition of the oil.

As explained herein before, gelatinization of the starch provided by the pulse seed components enhances the water-structuring properties of said component. The starch provided by the pulse seed component may suitably be gelatinized by heating the aqueous dispersion containing finely ground pulse seed to a temperature in excess of 60° C. for a sufficiently long period of time.

Preferably, the presence process comprises the step of heating the aqueous dispersion containing the finely ground pulse seed to gelatinize the starch contained therein. Depending on the heating temperature, the preferred times are as follows:

60-70° C.: 10-120 minutes
70-80° C.: 5-80 minutes
80-100° C. 5-70 minutes
100-120° C.: 60-1200 seconds
120-150° C.: 30-480 seconds The aforementioned heat treatment of the aqueous dispersion also improves the emulsifying properties of the pulse seed component as it causes denaturation of proteins contained therein and because the emulsifying properties of these denatured proteins are superior to those of the non-denatured proteins.

The pulse flour that is mixed with water to prepare the aqueous dispersion preferably has the same composition as described herein before in relation to the pulse seed that is contained in the edible oil-in-water emulsion of the present invention.

An important advantage of the present process lies in the fact that it can be operated without the need of preparing the emulsion under high shear homogenization conditions. Accordingly, in a preferred embodiment of the process mixing of the oil-and-water phases does not comprise a high pressure homogenization step at a pressure higher than 150 bar. The final emulsion can be made by mixing water and oil phases in conventional mixers under moderate shear e.g. at less than 4500 rpm. The mixing of the oil and water phases may suitably be achieved by using conventional mixers or standard devices for preparing mayonnaise, such as a colloid mill.

Preferably, the present process comprises the addition of an acidulant to adjust the pH of the aqueous dispersion to a pH within the range of 3.0 to 5.0. According to a particularly preferred embodiment, the acidulant is added, after the oil has been added to the aqueous dispersion, even more preferably after the oil-in-water emulsion has been produced by the mixing. The inventors have unexpectedly found that post-addition of acidulant to the final emulsion increased G' at least by 30% as compared to when the acidulant was added prior to the oil addition.

As explained herein before, the pulse flour can be used to partially or fully replace emulsifiers and/or water-structuring agents that are commonly employed in retail emulsions such as mayonnaise and dressings. Thus, the emulsion may suitably be prepared without adding a modified starch. In accordance with a particularly preferred embodiment, the present process does not comprise the addition of a water structuring agent selected from the group consisting of modified cellulose, modified starch, xanthan, agar, gelatin, carrageenan, gellan, galactomannans, konjac glucomannan, gum arabic, pectin, alginate, chitosan.

Likewise, the present process preferably does not comprise the addition of an emulsifier selected from lecithin, monoglyceride, diglyceride and PEG ester.

In the present process the aqueous dispersion is suitably prepared by mixing pulse flour with water and optionally further ingredients. Preferably, the pulse flour employed has a mass weighted average particle size of 10-500 μm, more preferably of 15-120 μm, and containing less than 90 wt. % of particles, preferably less than 95 wt. % of particles having a diameter of 150 μm or more. The particle size distribution of the pulse flour is suitably determined with the help of sieves.

The pulse flour employed in the present process is advantageously obtained from a pulse seed selected from lentils, chickpeas, beans and combinations thereof. Even more preferably, the pulse flour is obtained from a pulse selected from lentils, chickpeas, mung beans and combinations thereof. Most preferably, the pulse flour is obtained from lentils. Likewise, the pulse seed employed in the present process is preferably selected from lentils, chickpeas, beans and combinations thereof, lentils being most preferred.

According to a particularly preferred embodiment of the present process the oil-in-water emulsion obtained by the process is an oil-in-water emulsion as defined herein before.

The invention is further illustrated by means of the following non-limiting examples.

EXAMPLES

Example 1

Mayonnaise having an oil content of 50 wt. % was prepared on the basis of the formulation described in Table 1.

TABLE 1

| Ingredient | % wt |
|---|---|
| Milled dehulled red lentil | 2.50 |
| Water | 40.90 |
| NaCl | 1.60 |
| Sucrose | 2.00 |
| Oil | 50.00 |
| Vinegar (12% acetic acid) * | 3.00 |

* Adjust to pH 3.6-3.8

The procedure used to produce the mayonnaise was as follows:
- Mill the lentils in a grinder to produce flour having a mass weighted average particle size of appr 40 μm and less than 1 wt. % particles larger than 120 μm.
- Mix the flour into cold water.
- Heat mixture to 95° C. and maintain at 90-95° C. for 30 min.
- Cool mixture to 30-40° C.
- Add sugar and salt.
- Add oil slowly with Silverson mixer, about 4000 rpm.
- Adjust pH with vinegar during last stage of mixing.

The mayonnaise so obtained had a creamy, smooth glossy appearance, a neutral taste and an off-white colour. The product further had a G' of 1610 Pa, measured at 20° C. after 7 days. The product did not show any signs of emulsion destabilization when it was stored for up to 20 weeks at 5° C.

Example 2

Example 1 was repeated, except that the red lentils were replaced by other pulses. The characteristics of the mayonnaise products so obtained are summarized in Table 2.

TABLE 2

|  | Black Gram | Mung Bean | Black Lentil | Chick Pea |
|---|---|---|---|---|
| colour | dehulled whitish | hulled whitish | hulled greyish with dark specks | hulled whitish with a yellow tinge |
| flavour/odour | neutral | neutral | neutral | neutral |
| G' (Pa)* | 1136 | 1420 | 1405 | 883 |

*Measured after 7 days at 20° C.

Stability and organoleptic characteristics of these mayonnaises were comparable to that of the mayonnaise described in Example 1.

Example 3

Example 1 was repeated, except that the levels of red lentil, water and oil were varied as indicated in Table 3.

TABLE 3

|  | A | B | C | D | E |
|---|---|---|---|---|---|
| Red Lentil | 3.70 wt. % | 3.0 wt. % | 2.5 wt. % | 1.5 wt. % | 0.5 wt. % |
| Water | 60.0 wt. % | 50.0 wt. % | 40.0 wt. % | 30.0 wt. % | 20.0 wt. % |
| Oil | 30.0 wt. % | 40.0 wt. % | 50.0 wt. % | 60.0 wt. % | 70.0 wt. % |
| G' * | 987 Pa | 1445 Pa | 1439 Pa | 1148 Pa | 743 Pa |

* Measured after 7 days at 20° C.

All these mayonnaise products were found to be of acceptable quality.

Example 4

Example 1 was repeated, except that the vinegar was added at different stages of the production process as indicated in Table 4.

TABLE 4

| moment of acidification | G' (Pa) |
|---|---|
| before cooking lentil-and-water slurry | 550 |
| after cooking lentil-and-water slurry (hot) | 643 |
| after cooking and cooling lentil-and-water slurry | 654 |
| after emulsification | 1235 |

Example 5

The mayonnaise described in Example 1 was treated with protease using the protocol described herein before. G' and viscosity of the mayonnaise were measured at 20° C., using the methodology described herein before (except that viscosity was measured at a shear rate of 50 $s^{-1}$ instead of 10 $s^{-1}$). The results are shown in Table 5.

TABLE 5

|  | G' (Pa) | Viscosity at 50 $s^{-1}$ (Pa · s) |
|---|---|---|
| Mayonnaise treated with protease | 138 | 0.76 |
| Mayonnaise control | 882 | 3.58 |

Comparative Example

A chickpea mayonnaise was prepared on the basis of the recipe shown in Table 6.

TABLE 6

|  | grams | Wt. % |
|---|---|---|
| 1 medium sized onion, diced into 1-inch pieces | 80 | 17.2 |
| 1 large garlic clove, crushed | 6.3 | 1.4 |
| ¼ cup sherry vinegar | 57 | 12.2 |
| ½ teaspoon freshly ground black pepper | 0.4 | 0.1 |
| ½ teaspoon ground cumin | 0.4 | 0.1 |
| ½ teaspoon sweet paprika | 0.4 | 0.1 |
| 1 can chickpeas, rinsed and drained | 240 | 51.6 |
| ¼ cup of tightly packed fresh basil leaves | 15 | 3.2 |
| ¼ to ⅓ cup of extra virgin olive oil | 65 | 14.0 |
| Salt | 1 | 0.2 |

The mayonnaise was prepared by combining the onion, garlic, vinegar, black pepper, cumin, paprika and red pepper in a glass bowl. Next, the bowl was covered with a paper towel and heated in a microwave at high power for 3 minutes. Next, the contents of the bowl were allowed to cool down. In the meantime, the chickpeas, basil and olive oil were introduced in a food processor starting with the smallest amounts.

Next, the cooled vinegar-onion mixture was added and the mixture was puréed. Salt was added and the mixture was further puréed.

Furthermore, a chickpea mayonnaise was made using the same recipe and procedure, except that no onion or garlic was used.

After 5 day storage in a fridge, G' of the chickpea mayonnaises was determined using the methodology described herein before. In addition, the particle size distribution of the oil droplets was analysed by means of confocal laser microscopy. The results are shown in Table 7.

TABLE 7

|  | G' | Vol. % oil droplets <20 μm |
|---|---|---|
| Chickpea mayonnaise containing onion + garlic | 47,100 Pa | <<80 vol. % |
| Chickpea mayonnaise without onion + garlic | 27,600 Pa | <<80 vol. % |

The chickpea mayonnaise without onion was treated with protease using the protocol described herein before. G' and viscosity of the mayonnaise were measured at 20° C., using the methodology described herein before (except that viscosity was measured at a shear rate of 50 s$^{-1}$ instead of 10 s$^{-1}$). The results are shown in Table 8.

TABLE 8

|  | G' (Pa) | Viscosity at 50 s$^{-1}$ |
|---|---|---|
| Mayonnaise treated with protease | 3790 | 2.29 |
| Mayonnaise control | 4140 | 2.62 |

The invention claimed is:

1. An edible oil-in-water emulsion comprising:
    (a) 15-80 wt. % of a continuous aqueous phase, said aqueous phase having a pH in the range of 3.0-5.0;
    (b) 20-85 wt. % of a dispersed oil phase comprising 80-100 vol. % of oil droplets having a diameter of less than 20 μm;
wherein the emulsion has an elastic modulus G' at 20° C. of 100-3500 Pa and contains 0.1-8% of finely ground pulse seed, calculated as dry matter by weight of aqueous phase, said finely ground pulse seed being obtained from pulse seed having the following composition, calculated on dry matter:
    (i) 30-60 wt. % of starch;
    (ii) 1-40 wt. % of dietary fiber;
    (iii) 0.5-12 wt. % of sugars;
    (iv) 15-35 wt. % of protein;
    (v) 0.8-12 wt. % of oil;
wherein starch, dietary fiber, sugars, protein and oil together make up 95-100 wt. % of the dry matter contained in the pulse seed; wherein the pulse seed contains starch and protein in a weight ratio of 2:3 to 3:1; wherein 60-100 wt. % of the of the protein comprised in the finely ground pulse seed is denatured; and wherein 50-100 wt. % of the starch comprised in the emulsion is gelatinized starch.

2. Oil-in-water emulsion according to claim 1, wherein the pulse seed contains 0.8-8% of oil by weight of dry matter.

3. Oil-in-water emulsion according to claim 1, wherein the pulse seed contains starch and protein in a weight ratio of 1:1 to 5:2.

4. Oil-in-water emulsion according to claim 1, wherein the pulse seed contain globulins and albumins in a weight ratio that lies within the range of 10:1 to 1:1.

5. Oil-in-water emulsion according to claim 1, wherein the globulins legumin and vicilin together represent at least 35 wt. % of the protein comprised in the pulse seed.

6. Oil-in-water emulsion according to claim 1, wherein 70-100 wt. % of the starch comprised in the emulsion is gelatinized starch.

7. Oil-in-water emulsion according to claim 1, wherein the emulsion contains at least 0.1 wt. % of an acidulant selected from acetic acid, citric acid, lactic acid, malic acid, phosphoric acid, hydrochloric acid, glucono-delta-lactone and combinations thereof.

8. Oil-in-water emulsion according to claim 1, wherein the finely ground pulse seed is obtained from a pulse seed selected from lentils, chickpeas, beans and combinations thereof.

9. Oil-in-water emulsion according to claim 8, wherein the finely ground pulse seed is finely ground lentils.

10. Oil-in-water emulsion according to claim 1, wherein the emulsion contains no added water structuring agent selected from modified cellulose, modified starch, xanthan, agar, gelatin, carrageenan, gellan, galactomannans, konjac glucomannan, gum arabic, pectin, alginate, chitosan.

11. Oil-in-water emulsion according to claim 1, wherein the oil-in-water emulsion is a mayonnaise or a dressing.

12. A process of preparing an oil-in-water emulsion comprising 15-80 wt. % of a continuous aqueous phase and 20-85 wt. % of a dispersed oil phase, said process comprising:
    (a) preparing an aqueous dispersion containing 0.1-8 wt. % of finely ground pulse seed by mixing pulse flour and water and/or by shearing or milling a mixture of water and pulse seeds, wherein the finely ground pulse seed is obtained from pulse seed as defined in claim 1;
    (b) adding oil to the aqueous dispersion to produce an oil-and-water mixture; and
    (c) mixing the oil-and-water mixture to produce an oil-in-water emulsion comprising 80-100 vol. % of oil droplets having a diameter of less than 10 μm;
wherein 50-100 wt. % of the starch comprised in the aqueous dispersion is gelatinized prior to the addition of the oil.

13. Process according to claim 12, wherein, after the addition of the oil, acidulant is added to adjust the pH of the aqueous dispersion to a pH within the range of 3.0 to 5.0.

14. Process according to claim 12, wherein the finely ground pulse seed is obtained from a pulse seed selected from lentils, chickpeas, dry beans and combinations thereof.

15. Process according to claim 12, wherein the oil-in-water emulsion obtained by the process is an oil-in-water emulsion according to claim 1.

* * * * *